(12) United States Patent
Laconto et al.

(10) Patent No.: US 8,025,808 B2
(45) Date of Patent: *Sep. 27, 2011

(54) METHODS FOR MACHINE CERAMICS

(75) Inventors: Ronald W. Laconto, Leicester, MA (US); Douglas E. Ward, Santa Ana, CA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/953,741

(22) Filed: Dec. 10, 2007

(65) Prior Publication Data

US 2008/0153396 A1    Jun. 26, 2008

Related U.S. Application Data

(63) Continuation-in-part of application No. 10/423,283, filed on Apr. 25, 2003, now Pat. No. 7,306,748.

(60) Provisional application No. 60/871,067, filed on Dec. 20, 2006.

(51) Int. Cl.
*B44C 1/22* (2006.01)
*C03C 25/68* (2006.01)
*C03C 15/00* (2006.01)
*C23F 1/00* (2006.01)

(52) U.S. Cl. .......................................................... 216/89
(58) Field of Classification Search .................... 216/89, 216/88; 51/309
See application file for complete search history.

(56) References Cited

U.S. PATENT DOCUMENTS

| | | | |
|---|---|---|---|
| 5,366,542 A | 11/1994 | Yamada et al. | |
| 5,437,887 A | 8/1995 | Yarkosky et al. | |
| 5,549,978 A | 8/1996 | Iwasaki et al. | |
| 5,846,280 A | 12/1998 | Speit | |
| 5,999,368 A | 12/1999 | Katayama | |
| 6,007,592 A * | 12/1999 | Kasai et al. ................... | 51/309 |
| 6,033,293 A | 3/2000 | Crevasse et al. | |
| 6,336,945 B1 | 1/2002 | Yamamoto et al. | |
| 6,439,986 B1 | 8/2002 | Myoung et al. | |
| 6,497,611 B2 | 12/2002 | Sakurada et al. | |
| 6,500,049 B2 | 12/2002 | Orii et al. | |
| 6,509,269 B2 | 1/2003 | Sun et al. | |
| 6,604,987 B1 | 8/2003 | Sun | |
| 6,755,721 B2 | 6/2004 | Ward et al. | |
| 2001/0009840 A1 | 7/2001 | Orii et al. | |
| 2001/0044264 A1 | 11/2001 | Lack et al. | |
| 2001/0049913 A1 | 12/2001 | Miyata | |
| 2001/0055938 A1 | 12/2001 | Fujimura et al. | |
| 2002/0031979 A1 | 3/2002 | Sakurada et al. | |
| 2004/0033690 A1 | 2/2004 | Schowalter et al. | |

(Continued)

FOREIGN PATENT DOCUMENTS

DE    101 47 897 C    1/2003

(Continued)

OTHER PUBLICATIONS

Honglin Zhu, "Chemical Mechanical Polishing (CMP) of Sapphire," Abstract of Dissertation, 1 p.

(Continued)

*Primary Examiner* — Roberts Culbert
(74) *Attorney, Agent, or Firm* — Abel Law Group, LLP

(57) ABSTRACT

A method for machining a ceramic substrate containing Al, including providing a solution containing a phosphorus compound on the ceramic substrate; and machining the substrate with an abrasive.

17 Claims, 5 Drawing Sheets

U.S. PATENT DOCUMENTS

| | | |
|---|---|---|
| 2004/0256595 A1 | 12/2004 | Hamill et al. |
| 2005/0208883 A1 | 9/2005 | Yoshida et al. |

FOREIGN PATENT DOCUMENTS

| | | |
|---|---|---|
| EP | 0401147 A2 | 12/1990 |
| EP | 0280438 A2 | 8/2008 |
| GB | 2398075 A | 8/2004 |
| GB | 2403954 A | 1/2005 |
| JP | 2278822 A | 11/1990 |
| JP | 11-181409 | 7/1999 |
| JP | 2001240850 | 9/2001 |
| KR | 2000-0024453 | 5/2000 |
| WO | 0112740 A | 2/2001 |
| WO | 0112740 A1 | 2/2001 |
| WO | 0136554 A1 | 5/2001 |
| WO | 0136654 A1 | 5/2001 |
| WO | 0174959 A2 | 10/2001 |
| WO | 03031527 A1 | 4/2003 |
| WO | 03031671 A2 | 4/2003 |
| WO | 2004/078410 A | 9/2004 |

OTHER PUBLICATIONS

Rami Schalair, et al., "An Alumina-Ceria CMP Slurry for Glass," Saint-Gobain Ceramics & Plastics product brochure, 12 pp.

All Organic Corrosion Inhibitor for Ferrous Metals Application Information, Belcor 575, 9 pp.

L. J. Schowalter, et al., "Preparation and characterization of Single-Crystal Aluminum Nitride Substrates", Mater. Res. Soc. Symp. Proc. 595, W6.7.6, 2000, Abstract.

Partial translation JP 2001-240850, "Dispersing Agent for Abrasive Grain for Polishing and Slurry for Polishing," Sep. 4, 2001.

* cited by examiner

METHODS FOR MACHINE CERAMICS

The present application is a continuation-in-part of U.S. patent application Ser. No. 10/423,283, filed Apr. 25, 2003, and the present application claims priority from U.S. Provisional Application No. 60/871,067, filed Dec. 20, 2006, of which both applications are incorporated by reference herein in their entirety.

BACKGROUND

1. Field of the Invention

The present invention is generally related to machining ceramic substrates.

2. Description of the Related Art

Machining operations, broadly including grinding, lapping and polishing operations, are widely used throughout various industries in order to obtain desired surface finishes and to shape components. Machining operations are widely utilized in the context of non-metal, inorganic components, such as glass, glass-ceramic and ceramic components, which are deployed in a wide variety of end uses. For example, glass and glass-ceramic components are utilized widely as building materials in both commercial and residential applications. Also, glass materials are widely utilized in electronic packaging, optical applications, and solar applications, and as advanced materials in lighting and architectural applications, and increasingly as flat panel displays.

Machining, and in particular, polishing of substrates is widely used for formation of various devices, including microelectronic devices. For example, during wafer processing to form integrated circuit devices, wafers are subjected to chemical-mechanical polishing (CMP) to remove layers and planarize the wafer. In the area of magneto-resistive (MR) head manufacture, aluminum alloy substrates are polished to form jigs, and air-bearing surfaces of read/write heads for hard disk drives (HDD's) are polished and planarized.

In the context of machining, abrasive slurries are commonly used in lapping operations as well as polishing operations. Lapping generally denotes processes utilizing fairly large abrasive particles (e.g., 2-10 microns), and associated high material removal rates. Polishing, on the other hand, generally takes advantage of smaller abrasive particles, yields fairly low material removal rates, and superior surface finishes. Typically, one of the goals of a polishing operation is to provide a planar surface having relatively low surface roughness, free of defects such as scratches, "orange peel," and "pull-out" of material along the exposed surface of the substrate. In addition, with respect to substrates having multiple phases of materials that are being polished (e.g., a hard ceramic portion and a soft conductive layer, such as in the case of HDD recording heads), it is also important to engineer a polishing operation which has a consistent material removal rate across different materials, so as to prevent selective polishing of soft materials of the substrate.

In an effort to increase polishing rates, reduce material removal selectivity, and reduce defects, polishing technology has evolved to combine mechanical removal (i.e., abrasion) of substrate material, along with a chemical reactive process. Such processes have been described in the industry as chemical-mechanical polishing, CMP, as noted above. The development of CMP processes and slurries containing such chemical and mechanical components have been intensely studied in certain areas such as semiconductor processing. However, a need continues to exist in the art for improved machining operations and slurries for carrying out such operations, and in particular, slurries and operations intended to polish aluminum-containing ceramics, such as alumina, alumina composites, non-oxide aluminum containing ceramics and the like.

Other technologies focus on use of a fixed abrasive, in which the abrasive particles are fixed in position. Here, a fixed abrasive is generally defined as one of two types of abrasive components, a bonded abrasive or a coated abrasive component. Coated abrasives generally have a flexible backing to which abrasive particles are bonded, while bonded abrasives are generally composed of abrasive particles that are bonded together such as by a matrix that forms an intergranular bonding phase. Such fixed abrasives should be contrasted against free abrasives or abrasive slurries, in which the abrasive particles are generally loose, often times in a fluidic suspension, such as an aqueous suspension. Fixed abrasives provide numerous advantages during machining operations including potentially improved planarity and improved process control. However, a need continues to exist in the art for improved machining operations utilizing fixed abrasive components, particularly in the context of glass, glass-ceramic and ceramic components

SUMMARY

According to an aspect of the present invention, a method for machining a ceramic substrate containing Al includes providing a solution containing a phosphorus compound on the ceramic substrate and machining the substrate with an abrasive.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Abrasive Slurry Embodiments

Figure 1:
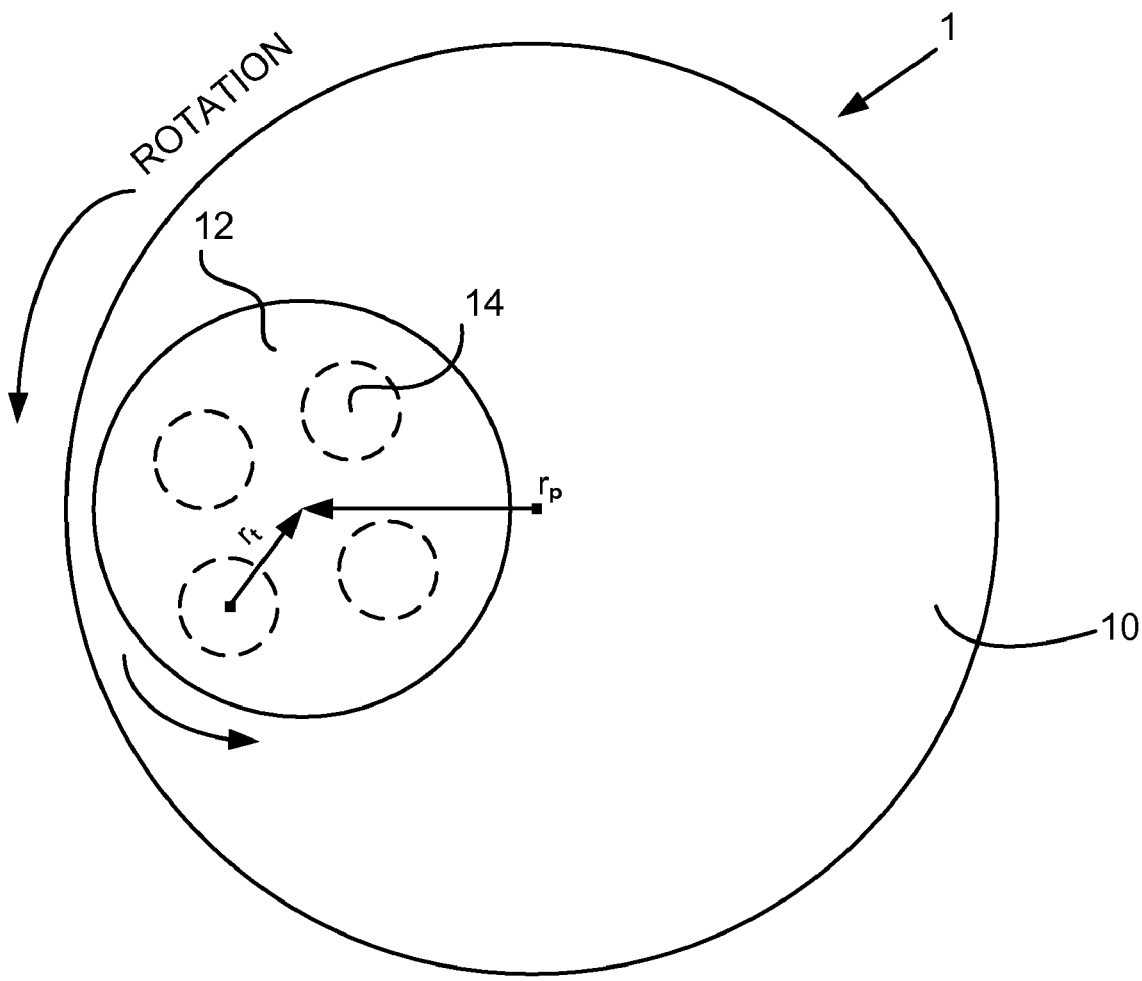
FIG. 1 illustrates a schematic view of a polishing structure used in accordance with an embodiment of the present invention.

According to one aspect of the invention, a method for machining a ceramic substrate is provided. The ceramic substrate contains the element aluminum, and includes aluminum oxide and non-oxide ceramic materials. According to the method, a slurry is provided between the substrate and a machine tool, and the substrate is moved relative to the machine tool to carry out the machining operation. According to a particular feature of this embodiment, the slurry contains an alumina abrasive and an additive containing a phosphorus compound.

The slurry generally falls into the category of chemical-mechanical polishing (CMP) slurries. Effectively, the alumina abrasive provides the mechanical component, and the phosphorus compound is a chemically active component to aid in the machining operation, such as polishing.

Turning to the alumina abrasive, the median particle size may be within a range of about 0.05 microns to about 1.5 microns. Typically, the median particle size is within a slightly narrower range, such as within a range of about 0.1 to about 1.0 microns, such as 0.10 to about 0.50 microns. Specification of the median particle size to be under 1.0 micron generally denotes a polishing process in which a fine surface finish is provided by carrying out the machining operation at fairly low material removal rates. At median particle sizes above about 1 micron, such as on the order of 2 to 5 microns, typically the machining operation is characterized as a lapping operation.

As stated above, the ceramic substrate generally contains the element aluminum. The particular composition of the substrate may vary, such as aluminum oxide (alumina) or aluminum oxide-containing compositions. Such compositions generally include at least one other component, and examples of such components include yttria aluminate, aluminosilicate, alumina-titanium carbide (AlTiC), aluminum oxynitride (AlON), and aluminum-containing garnets and spinels. The substrate may be polycrystalline or monocrystalline. In the case of alumina, the single crystalline material is known as sapphire. In this regard, the sapphire may be machined (e.g., polished) along one of the common crystallographic planes of the material, such as the c-plane, the a-plane, or the r-plane. In addition to aluminum oxide based materials, the ceramic substrate may be formed of an aluminum non-oxide material, such as aluminum nitride.

According to an embodiment of the present invention, the phosphorus compound contains oxygen, wherein oxygen is bonded to the phosphorus element. This class of materials is known as oxophosphorus materials. Preferably, the oxophosphorus compound contains phosphorus in valency state of one, three or five, and in particular embodiments, effective machining has been carried out by utilizing an oxophosphorus compound in which the phosphorus is in a valency state of five.

In certain embodiments, the phosphorus may be bonded to carbon in addition to oxygen, which generally form organic phosphorus compounds known as phosphonates. For example, phosphonates may be selected from the group consisting of gylcine-N,N-di (GDMP), aminotri (ATMP), N-2 hydroxyethyl-N,N-di (HEMPA), ethylenediaminetetra (EDTMPA), hexamethylenediaminetetra, diethylenetriaminepenta, phosphonoformate salts, hydroxyphosphono acetic acid (HPA), 2-phosphonobutane-1,2,4-tricarboxylic acid (PBTC), 1-hydroxyethylidine-1,1'-diphosphonic acid (HEDP) and salts thereof. Other groups of phosphorus compounds include phosphates, pyrophosphates, hypophosphates, subphosphates, phosphites, pyrophosphites, hypophosphites and phosphonium compounds. Particular species of the phosphorus compounds include potassium phosphate, sodium hexametaphosphate, hydroxy phosphono acetic acid (Belcor 575) and aminotri-(methylenephosphonicacid) (Mayoquest 1320).

Typically, the slurry containing the abrasive component and the additive containing the phosphorus compound is aqueous, that is, water-based. The slurry may have a pH greater than about 8, such as greater than about 8.5. The pH may range up to a value of about eleven. However, a suitable range may be within a slightly narrow range such as about 9 to about 9.5.

FIG. 1 illustrates a schematic of the basic structure of a polishing apparatus according to an embodiment of the present invention. The apparatus 1 includes a machine tool, which in this case is formed by a polishing pad 10 and a platen, which supports the polishing pad. The platen and polishing pad are of essentially the same diameter. The platen is rotatable about a central axis, along a direction of rotation as illustrated by the arrow. A template 12 has a plurality of circular indentations which respectively receive substrates 14, the substrates 14 being sandwiched between the polishing pad 10 and the template 12. The template 12, carrying the substrates 14, rotates about its central axis. $r_p$ represents the radius from the center of rotation of the polishing pad to the center of the template 12, whereas $r_t$ represents the radius from an individual substrate to the center of rotation of the template. The configuration of apparatus 1 is a commonly employed configuration for polishing operations, although different configurations may be utilized. In this particular case, the net velocity or speed of the substrates relative to the polishing pad is calculated according to the following equation. Namely, the general formula for velocity of the rotating platen and template is:

$$(2 \cdot \pi \cdot r (\text{inches}) \times \text{rpm})/60 \times 39.37 = V(\text{meters/second}),$$
which gives:

$$((2 \cdot \pi \cdot r_p \cdot \text{rpm})/60 \times 39.37) + ((2 \cdot \pi \cdot r_c \cdot \text{rpm})/60 \times 39.37) = V$$

Calculations were carried out to determine the rotational velocity of each of the platen/polishing pad assembly and the template 12. To approximate the linear velocity (net) of the substrate 14 relative to the platen assembly, one half of the velocity of the template 14 was added to the velocity of the platen assembly. This resultant net velocity actually represents an average of the velocity of the substrates experienced relative to the platen during a polishing cycle. In this regard, it is noted that the actual velocity of the substrates varies according to the rotational position of the substrates. For example, at nine o'clock position, a substrate will experience an instantaneous velocity of zero, assuming that the rotational speed of the platen is the same as the rotational speed of the template. On the other hand, at the three o'clock position, the substrate will experience a maximum velocity. According to an embodiment of the present invention, the velocity of the substrate relative to the platen assembly (net) is not less than about 2.0 m/s. Other embodiments were operated at higher velocities, such as not less than about 2.3 m/s, not less than about 2.5 m/s, and not less than about 3.0 m/s. The actual relative velocity of the substrate is chosen so as to maximize the beneficial effects of the addition of the phosphorus containing compound additive in the slurry. In this regard, it was found that at certain minimum velocities, the chemical and mechanical polishing mechanisms acting on the substrate from the slurry containing a phosphorus-additive demonstrated superior results over slurries without such an additive.

Turning back to the slurry, a phosphorus additive may be present in the slurry at a concentration of about 0.05 to about 5 wt %, such as about 0.10 to about 3.0 wt %. Particular embodiments utilize a concentration within a slightly narrower range such as on the order of 0.10 to about 1.0 wt %. In this regard, the foregoing percentages relate to the phosphorus-based compound relative to the total wt % of the slurry. In this regard, it is typical that such a compound is provided in diluted form, such as in a 10% solution. The foregoing weight percent ranges relate to the phosphorus compound(s) and not the total weight percent of the additive, typically in diluted form. Further, the loading of solids in the slurry may vary depending on the particular application and apparatus undergoing machining operations. For example, the solids may be loaded within a range of about 2 to about 30 wt %, such as 2 to about 20 wt %. Certain embodiments are loaded with solids within a narrower range such as about 2 to about 10 wt %.

According to embodiments of the present invention, the material removal rate (MRR) was found to improve significantly over slurries having no phosphorus-based additive. According to one embodiment, a ratio $MRR_{add}/MRR_{con}$ is not less than about 1.2. In this regard $MR_{add}$ is the material removal rate of polishing the substrate with a slurry comprising an abrasive and the additive containing the phosphorus compound, whereas $MRR_{con}$ is the material removal rate under identical process conditions with a control slurry, the control slurry being essentially identical to the above-mentioned slurry but being free of the additive containing the phosphorus compound. Particular embodiments illustrated even superior material removal rate ratios, such as not less than about 1.5, or even not less than about 1.8. Certain examples illustrated an MRR ratio greater than about two, representing twice the removal rate over a slurry containing only an alumina abrasive and no phosphorus compound additive.

According to another embodiment of the present invention, a method for machining an aluminum-containing substrate is provided, in which a slurry containing an abrasive and an additive is provided between the substrate and a machine tool, and at least of one the substrate in the machine tool is moved such that the substrate is moved relative to the machine tool at a velocity not less than about 2.0 m/s. As above, the additive contains a phosphorus compound. The substrate may be stationary and the machine tool moved, or the machine may remain fixed and the substrate moved, or both the machine tool and the substrate may be moved. Typically, movement is rotational, as described above in connection with FIG. 1.

EXAMPLE 1

Turning to specific examples, a plurality of slurries according to embodiments of the present invention, and control slurries were prepared and tested utilizing the polishing apparatus 1 illustrated in FIG. 1. The testing was carried out on a single-side polishing apparatus as illustrated, equipped with a Suba H2 polishing pad from Rodel. Polishing pressure was 9 psi.

First, a slurry was provided having 3 wt % of a phosphate additive solution provided in an aqueous solution, loaded with 6 wt % alumina particles. In this regard, the 3 wt % additive solution was a 10% phosphate solution, such that the phosphate additive was loaded at 0.3 wt % in the slurry. The particular phosphate additive was hydroxyl phosphonic acid, commercially available as Belcor™ 575. This material is also referred to as HPA. The particular alumina particulate used is a commercially available powder from Saint Gobain Corporation having a designation 9240.2 mic The powder, forming the abrasive component, had a median particle size of about 0.2 microns, and was loaded in the slurry at a 6 wt % solids loading content. The slurry had a pH of approximately 10.2.

A second slurry was prepared identical to the first, but without a phosphate additive. The slurries were used to polish an alumina substrate, namely a sapphire substrate, along the c-plane. Several samples were polished at varying velocities, calculated as described above in connection with FIG. 1. Data was taken at velocities of 1.18, 2.30, 3.39, and 4.44 m/s. The results are shown in Table 1 below and in FIG. 2.

TABLE 1

| m/sec | MRR, No Phosphates | MRR, 3 wt % Phosphate additive sol'n |
|---|---|---|
| V = 4.44 | 8.7 | 16.3 |
| V = 3.39 | 6.0 | 10.3 |
| V = 2.30 | 6.3 | 6.3 |
| V = 1.18 | 4.3 | 4.7 |

Figure 2:
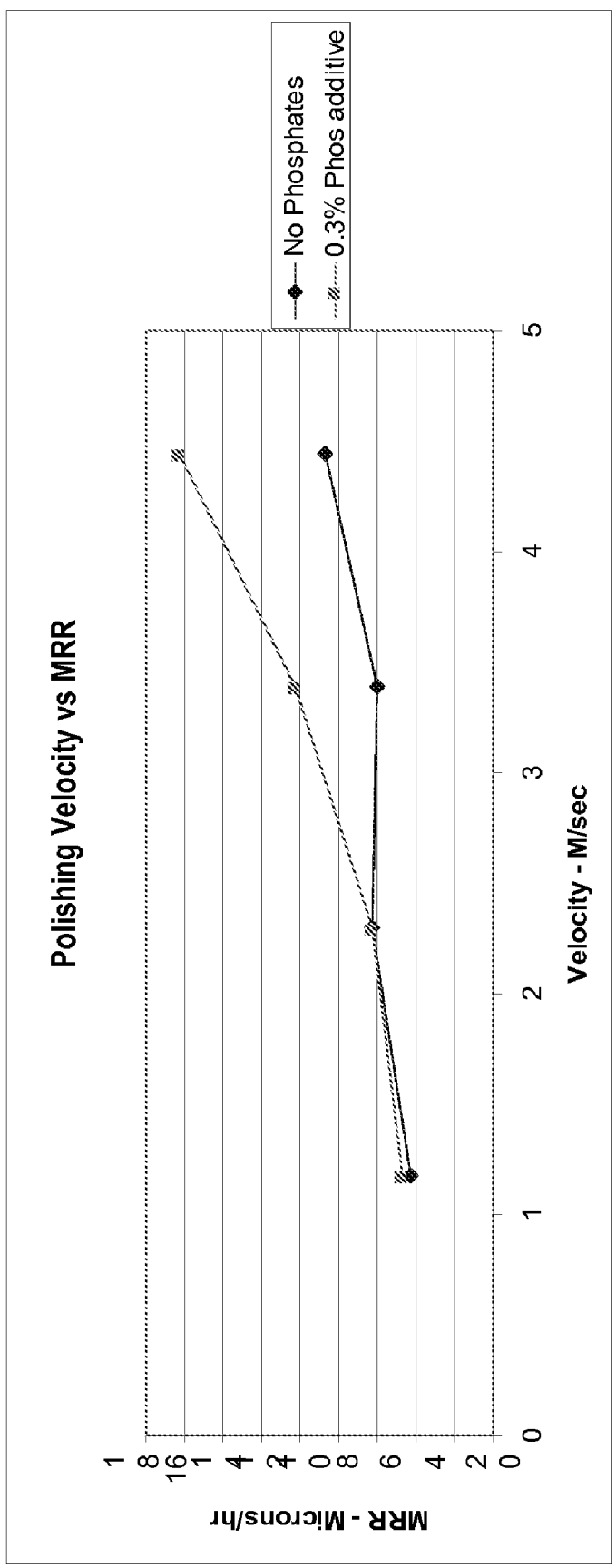
FIG. 2 illustrates the effective of polishing velocity on material removal rate according to various examples.

FIG. 2 and Table 1 summarize data of polishing velocity (net) of the substrate relative to the platen assembly, versus the material removal rate (MRR). As demonstrated by the data, in this particular embodiment, it was shown that at a net substrate velocity greater than 3.4, the sample containing the phosphate-based additive demonstrated clearly superior material removal characteristics.

EXAMPLE 2

Figure 3:
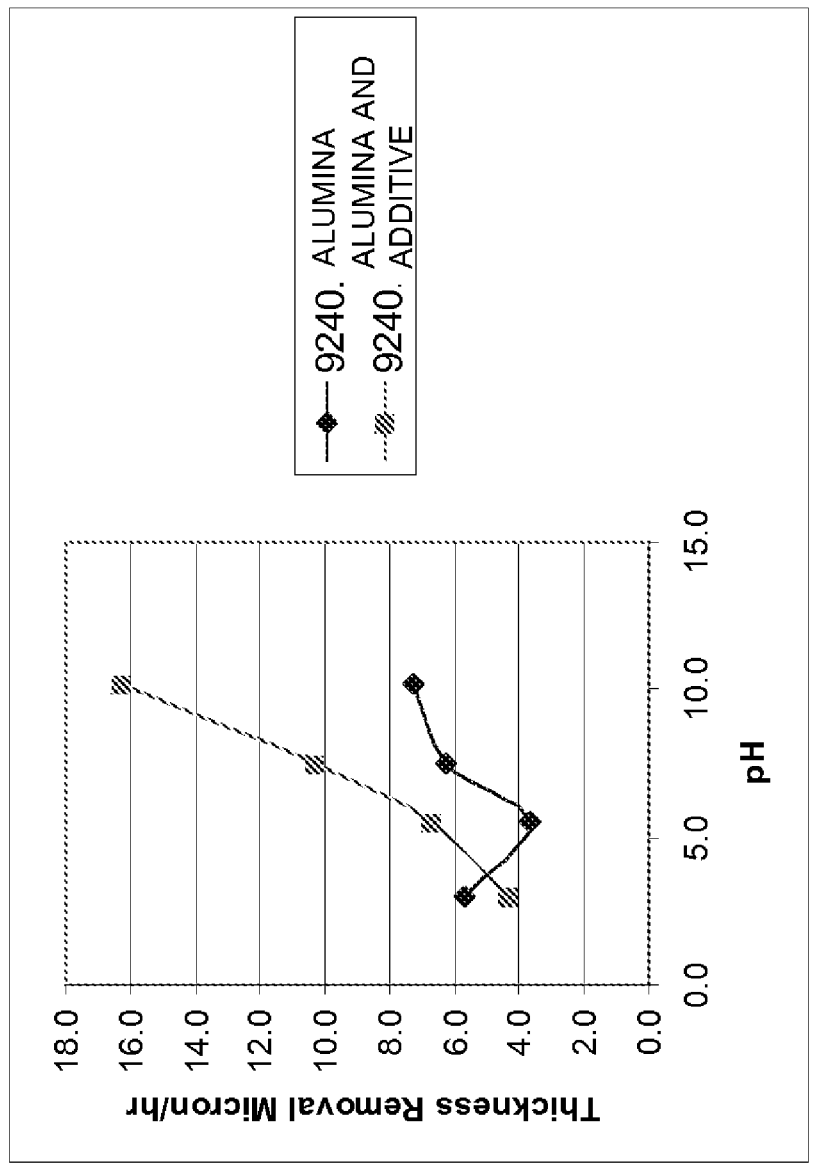
FIG. 3 illustrates the effect of pH on material removal rate according to various examples.

Slurries were prepared in essentially the same manner as in connection with Example 1, except that pH was varied by addition of KOH. In this regard, it was noted that the native pH by addition of the alumina particulate abrasive was 10.2, and that KOH was utilized to modify (reduce) the pH for testing. The results are shown below in Table 2 and FIG. 3.

TABLE 2

| SLURRY | | | | |
|---|---|---|---|---|
| pH | 3.0 | 5.5 | 7.5 | 10.2 |
| Alumina (μm/hr) | 5.7 | 3.7 | 6.3 | 7.3 |
| Alumina & Phosphate Additive (μm/hr) | 4.3 | 6.7 | 10 | 16.3 |

As illustrated, superior results were demonstrated as pH was increased. With respect to alumina/phosphate slurries according to embodiments of the present invention, preferably the pH is greater than about 8, such as greater than about 8.5.

EXAMPLE 3

Figure 4:
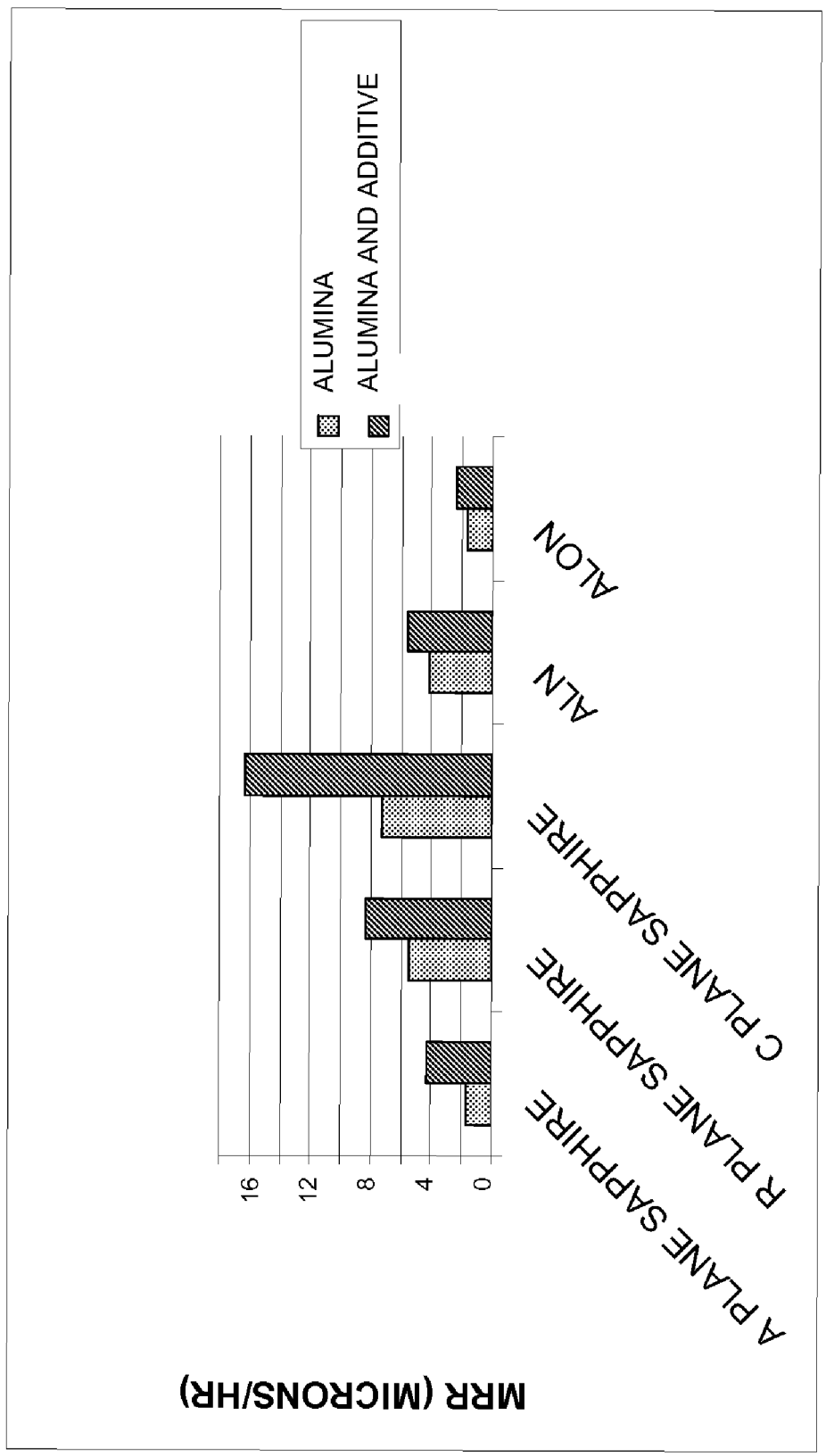
FIG. 4 illustrates the effect of a phosphate-based additive to an alumina slurry on material removal rate (MRR) according to various examples.

Next, slurries were prepared in the same manner as in Example 1, and utilized to polish various substrates, including a-plane, r-plane and c-plane sapphire, as well as aluminum nitride (AlN), and aluminum oxynitride (AlON). The results are shown below in Table 3 and FIG. 4. As illustrated, the use of the phosphorus additive was effective to improve polishing operations for all aluminum-containing ceramic materials tested.

TABLE 3

| | MRR Alumina | MRR Alumina + Additive | Ratio ($MRR_{add}/MRR_{con}$) |
|---|---|---|---|
| A PLANE SAPPHIRE | 1.70 | 4.30 | 2.53 |
| R PLANE SAPPHIRE | 5.50 | 8.30 | 1.51 |
| C PLANE SAPPHIRE | 7.30 | 16.30 | 2.23 |
| ALN | 4.20 | 5.60 | 1.33 |
| ALON | 1.70 | 2.33 | 1.32 |

EXAMPLE 4

Figure 5:
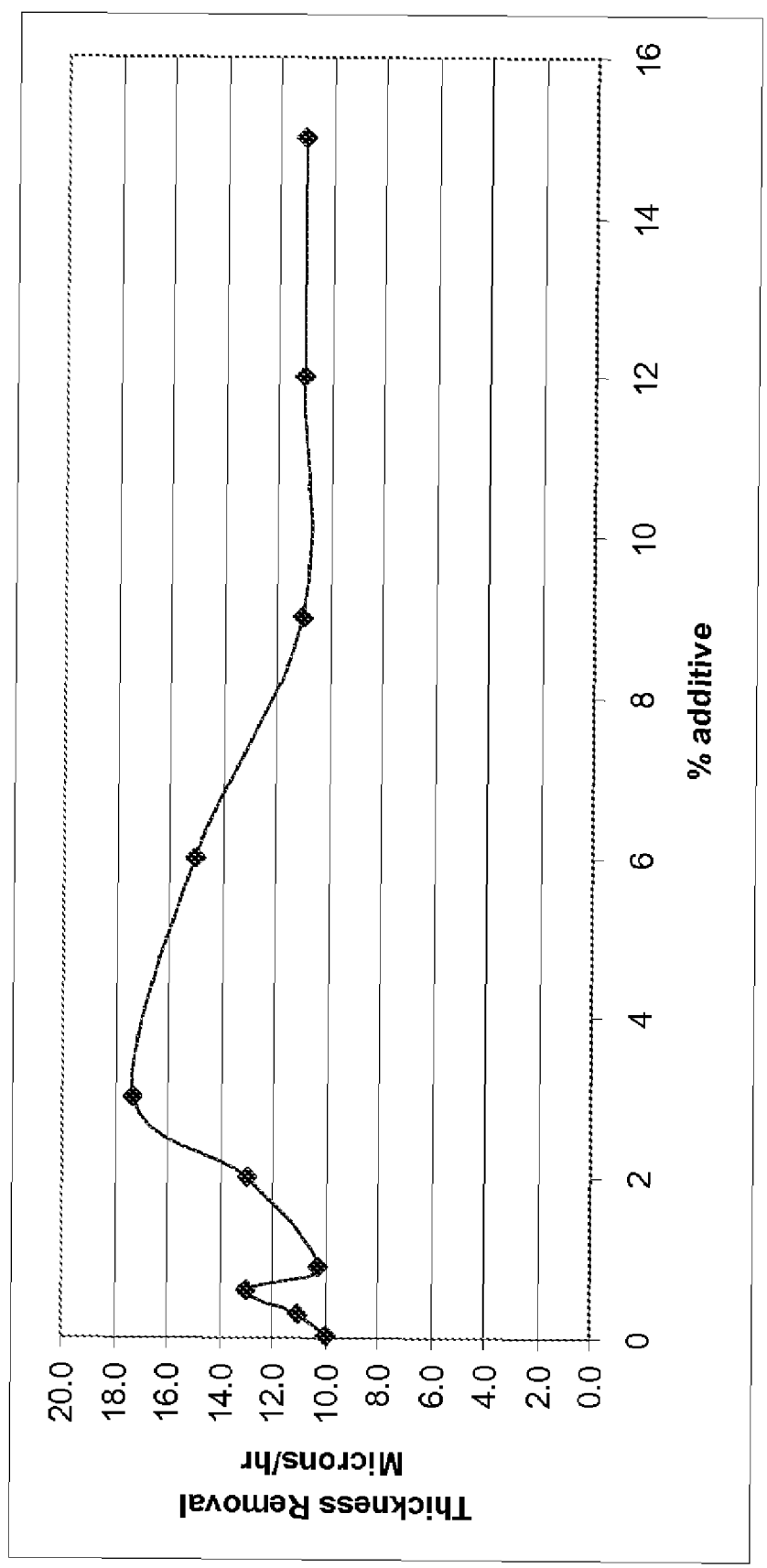
FIG. 5 illustrates the effect of concentration of a particular phosphate additive on material removal rate.

Next, slurries were prepared in the same manner as in Example 1, and the concentration of HPA was varied to investigate the effect of different levels of the phosphorus based additive. The different slurries were evaluated for material removal on c-plane sapphire. The results are shown below in FIG. 5 and Table 4. As above, MRR represents material removal rate in microns/hour. WRR represents weight removal in grams/hour. As illustrated, MRR increased from 0.03 wt % additive solution (0.003 wt % HPA additive) to 3.0 wt % of additive solution (0.3 wt % HPA additive), and slightly decreased at higher concentrations of HPA.

TABLE 4

| Additive solution wt % | MRR | WRR |
| --- | --- | --- |
| 0.03 | 10.0 | 0.0681 |
| 0.3 | 11.0 | 0.0760 |
| 0.6 | 13.0 | 0.0855 |
| 0.9 | 10.3 | 0.0781 |
| 2.0 | 13.0 | 0.1004 |
| 3.0 | 17.3 | 0.1250 |
| 6.0 | 15.0 | 0.1115 |
| 9.0 | 11.0 | 0.0900 |
| 12.0 | 11.0 | 0.0962 |
| 15.0 | 11.0 | 0.0931 |

EXAMPLE 5

Multiple slurries containing different phosphorus compounds were prepared and tested on c-plane sapphire. The additive HPA was provided at a loading level of 3000 ppm (0.3 wt % HPA, 3.0 wt % of a 10% solution), as above. The results are shown below in Table 5, summarizing MRR in microns/hr.

TABLE 5

| TEST | C PLANE SAPPHIRE |
| --- | --- |
| ALUMINA ONLY | 7.3 |
| POTASSIUM PHOSPHATE | 13.5 |
| SHMP | 12.5 |
| Belcor 575 | 16.3 |
| MAYOQUEST 1320 | 17.3 |
| MAYOQUEST 1635 | 11.3 |
| MAYOQUEST 2100 | 12.0 |
| Dequest 2010 | 9.5 |
| TRIBASIC CALCIUM PHOS | 7.0 |
| ALUMINUM PHOSPHATE | 7.6 |
| PHOSPHOROUS ACID | 10.7 |
| SODIUM HYPOPHOSPHITE | 9.0 |
| RHODAFAC | 11.0 |

Belcor 575 is hydroxy phosphono acetic acid. Dequest 2010 ishydroxyethylidene diphosphonic acid. Mayoquest 1320 is aminotri-methylenephosphonic acid. Mayoquest 1635 is hexapotassium hexamethylenediaminetetra-(methylenephosphonic acid). Mayoquest 2100 is 2-phosphonobutane-1,2,4-tricarboxylic acid. SHMP is sodiumhexametaphosphate. Rhodafac BP-769 is a phosphate acid ester of ethoxylated phenol. The Belcor 575 (hydroxy phosphono acetic acid) and Mayoquest 1320 (aminotrimethylenephosphonic acid) slurries show the best results, although many of the slurries demonstrated superior removal properties over alumina alone.

While the foregoing has focused on various embodiments, including embodiments based on alumina-based polishing slurries, other abrasive materials may be used as well with excellent results, including silica, zirconia, silicon carbide, boron carbide, diamond, and others. Indeed, the zirconia based slurries containing a phosphorus-based compound have demonstrated particularly good polishing characteristics, namely 30-50% improved material removal rates over silica alone on alumina substrates.

Fixed Abrasive Embodiments

According to an aspect of the present invention, a method for machining a workpiece is provided, which begins with application of a fluid between a fixed abrasive component and a workpiece. Generally, a fixed abrasive component is defined as noted above, that is, a component in which the abrasive particles are fixed in position, generally fixed in position relative to each other (bonded abrasive), or fixed in position relative to each other and to a backing member (coated abrasive). The actual configuration of the fixed abrasive may vary widely depending upon the application. For example, coated abrasives may utilize a paper, cloth, stitch bonded cloth, non-woven and woven materials, fiber or film backing, and the coated abrasive may take on several different geometric forms, including belts, discs, sheets, interlined sleeves, rolls, flap discs, flap wheels, and other geometric configurations. On the other hand, bonded abrasives are typically in the form of solid, integrated structures, such as in the form of grinding wheels, cylindrical wheels, cup wheels, dish wheels, segments, cones, mounted wheels, and points, bricks, and sticks. The bond matrix of the bonded abrasive component may be in the form of a glassy phase, such as a vitrified bond, or alternatively, may in the form of a resin bond, or a combination thereof.

Furthermore, in the particular context of coated abrasives, the fixed abrasive may be in the form of an engineered abrasive, which generally has a pattern of raised surface features, such in the form of pyramids, mounds, ridges, or other surface features.

Turning to the workpiece, generally aspects of the present invention are limited to non-metallic, inorganic materials, such as glass, glass-ceramic or ceramic compositions. Of the foregoing, those compositions having a notable glass phase, such as glass and glass-ceramic composites are machined according to certain embodiments of the present invention, and indeed, often times the workpiece may consist essentially of glass, that is, contains no other non-amorphous species that substantially affects its machinability. With respect to glass workpieces, the glass may be silica-based, having a silica microstructural backbone. Particular species of silica-based glass include borosilicate glass containing a notable content of $B_2O_3$, and optionally other oxides such as $Na_2O/K_2O$ and $Al_2O_3$. Other species include soda-lime glass, containing notable contents of $Na_2O$, $CaO$, $MgO$, and $Al_2O_3$.

The actual geometric configuration of the workpiece may vary, such as in the form of convex or concave contours, including tubing, optical fibers, and other configurations. Often, at least one major surface of the workpiece is planar, and that surface may be subjected to machining operations as described herein. Workpieces may be in the form of microlithography components, such as soda-line glass or I-line glass, fused silica, and calcium fluoride, wafer blank substrates, laser windows, and other forms. The workpiece may also be in the form of flat glass, such as utilized in commercial and residential construction industries, and may broadly include glass-ceramic compositions. Yet other common workpieces include glass components for optical devices, ranging from interference filters to parallel plane workpieces and instrument glasses, for example.

The composition of the grains of the fixed abrasive may vary among suitable materials, including aluminum oxide, zirconia, cerium oxide, silicon oxide, silicon carbide, boron carbide, garnet, cubic boron nitride, diamond and any other common abrasive being used. Embodiments of the present invention use particularly aggressive abrasives, and demonstrate high levels of efficacy in such contexts, such is as with diamond abrasives, carbide abrasives such as boron carbide (including cubic boron carbide), and silicon carbide, as well as garnet.

Further, the median particle size of the fixed abrasive particles may be fine, such as within a range of about 0.01 microns to about 1.5 microns, typically within a slightly narrower range, such as within a range of about 0.1 to 1.0 microns such as 0.10 to 0.50 microns. Specification of the median particle size to be under 1 micron generally denotes a polishing process in which a fine surface finish is provided by carrying out a machining operation at low material removal rates. However, according to other embodiments, the median particle size of the fixed abrasive may be higher, above 1 micron, such as on the order of 2 to 50 microns, or 2 to 10 microns. In this case, typically the machining operation is characterized as a lapping operation.

According to various embodiments, methods for machining a workpiece continue with the application of a fluid between the fixed abrasive component and the workpiece, followed by a translation of the fixed abrasive component and the workpiece relative to each other to remove material from the workpiece. In this respect, the fixed abrasive may be held stationary and the workpiece translated, the workpiece may be held stationary and the fixed abrasive component translated, or alternatively, both the fixed abrasive component and the workpiece may be translated. Translation may be carried out along different paths such as linear translation, as in the case of translating a closed loop coated abrasive belt on a stationary workpiece, may be rotational, as in the case of a rotating grinding disk or wheel, or a may be a combination of rotational and orbital, as in the case of a rotating fixed abrasive component, with the workpiece or fixed abrasive component orbiting about a central axis.

According to a particular feature, the fluid contains an anti-clogging agent, the anti-clogging agent generally comprising a phosphorus containing organic chemistry. The phosphorus-containing organic chemistry may have a functional group selected from the group consisting of phosphonates, phosphates, phosphoramides, phosphonamides, thiophosphates, thiophosphonates and phosphites. According to a particular embodiment, the functional group is a phosphonate. For example, phosphonates may be selected from the group consisting of gylcine-N,N-di (GDMP), aminotri (ATMP), N-2 hydroxyethyl-N,N-di (HEMPA), ethylenediaminetetra (EDTMPA), hexamethylenediaminetetra, diethylenetriaminepenta, phosphonoformate salts, hydroxyphosphono acetic acid (HPA), 2-phosphonobutane-1,2,4-tricarboxylic acid (PBTC), 1-hydroxyethylidine-1,1'-diphosphonic acid (HEDP) and salts thereof. According to particular working embodiments described herein, the anti-clogging agent includes at least HEDP.

According to another feature, the fluid may also include a lubricious component, the component being selected from the group consisting of 1) nonionic functional chemistries including alcohols, thiols, esters, amides, amines, amine oxides or imides and derivatives thereof, 2) anionic functional chemistries including phosphates, phosphonates, sulfates, sulfonates or carboxylates and derivatives thereof, 3) cationic functional chemistries such as quaternary amines or amine salts and derivatives thereof, and 4) amphoteric functional chemistries including proprionates, betaines, glycinates or sultaines and derivatives thereof.

Typically, the lubricious component is selected from non-ionic and anionic functional chemistries, and in the context of non-ionic functional chemistries, may be selected from the group consisting of alcohols, thiols, esters, imides, amides, imides, and derivatives thereof.

The fluid preferably utilizes water as the carrier solvent, but other appropriate solvents, such as glycols, alcohols and carbonates can be used. The primary consideration in solvent use is the ability of the solvent to solubilize the anti-clogging agent and lubricious components. The solvent also assists the anti-clogging agent through solvation and transport of debris from the fixed abrasive component. A particular concentration of the anti-clogging agent is between 0.001% w/w and 10% w/w, such as 0.1% w/w and 1.0% w/w (w/w=weight of anti-clogging agent/weight of fluid). Similarly, the lubricious component is typically used at concentrations between 0.01% w/w and 49% w/w. The solvent concentration is considered to be the balance of the concentration up to 100% w/w. In some embodiments the solvent and lubricious component are considered the same, as in the use of ethylene glycol for the balance of the concentration up to 100% w/w. Usable pH values, the negative log of the hydrogen ion concentration, lie within a range of 1.0 to 14.0, and for certain fluids a particular pH range is between 7.0 and 13.0. In instances where the pH of the fluid exceeds that of the anti-clogging agent dissolved in water, a base is used to attain the desired pH. For purposes of this invention, a base is considered a Lewis base, or any chemical substance capable of donating electron density. Examples of suitable bases include sodium hydroxide, ammonia or ethanolamine, but many others are acceptable. The preferred base is potassium hydroxide.

EXAMPLES

Composition A
  0.175% 1-hydroxyethylidine-1,1'-diphosphonic acid (HEDP) 0.125% potassium hydroxide (KOH)
  99.700% water
  pH=7.0
Composition B
  0.175% 1-hydroxyethylidine-1,1'-diphosphonic acid (HEDP)
  0.185% potassium hydroxide (KOH)
  0.100% Ucon 50-HB-660
  99.540% water
  pH=11.0
Composition C
  0.175% 1-hydroxyethylidine-1,1'-diphosphonic acid (HEDP)
  0.185% potassium hydroxide (KOH)
  0.200% Tomah AO-405
  99.440% water
  pH=11.0
Composition D
  0.175% 1-hydroxyethylidine-1,1'-diphosphonic acid (HEDP)
  0.125% potassium hydroxide (KOH)
  0.220% Acusol 445
  99.480% water
  pH=7.0

The test apparatus was a production size doublesided lapping machine (Speedfam 16B) equipped with fixed abrasive pads. Comparative lapping tests were carried out with only water and a coolant as the carrier fluid, while examples corresponding to embodiments of the present invention as described above incorporate a phosphorus-containing organic chemistry, particularly HEDP in connection with the Examples noted above. The machining was of various types of optical glass and the purpose was to remove stock quickly prior to a polishing step.

In the comparative lapping tests, after one or two production cycles, the abrasive pad would load with debris from grinding and two things would happen: 1) flatness would deteriorate 2) Material removal would drop dramatically because the abrasive was exposed much less. In contrast, the HEDP additive improved and maintained material removal performance for up to a week of grinding. In addition, it was found that the HEDP addition was effective with just water, where the lubricant was left out.

According to embodiments herein, applicants have discovered that utilization of a machining fluid incorporating an anti-clogging agent in the context of particular fixed abrasive machining applications of workpieces as described above, has notable impact on machining performance. It is generally known within the machining industry to utilize fixed abrasives in the context of machining operations, optionally with fluid additives to aid in material removal and swarf removal, for example. In addition, it is generally understood that in certain machining operations, it is desirable to utilize chemical species that have a chemical interaction with the workpiece undergoing machining, to aid in material removal and optionally aid in planarization of the workpiece, as in the case of CMP operations utilizing a loose abrasive. In contrast, according to embodiments of the present invention, it has been discovered that in fixed abrasive machining operations, utilization of the particular anti-clogging agents as described above has a notable impact on preventing clogging of the fixed abrasive.

In the particular context of machining borosilicate glass, fixed diamond pads have been utilized in grinding operations, such as 3M Trizact pads. However, during machining, oftentimes such pads would fully load or clog with material removed from the workpiece (substrate), sometimes within only two to three cycles. Such clogging has notable negative impacts, such as negatively impacting flatness of the workpiece. To address clogging and loading issues, pads may be dressed with a ceramic component, such as an alumina dressing pad, to remove clogged material. However, such dressing pads generally wear quickly and are costly to purchase in light of the fact that they are essentially consumables in the context of dressing applications. Applicants have noted substantial clogging of such pads even when used in combination with state of the art lubricious fluids, such as those described above, including, for example, Saberlube 9016.

Incorporation of an anti-clogging agent in the context of machining operations of borosilicate glass has been found to greatly improve the duration of machining between dressing operations. Indeed, it was found that machining could be operated for an entire week without dressing, which represents a 90% improvement over the state of the art with the same number of cycles per day.

While functional chemistries such as phosphonate functional chemistries have been utilized in the context of machining operations with free abrasive slurries to aid in material removal, aspects of the present invention take advantage of an anti-clogging phenomenon in the context of fixed abrasive machining. Such combination with fixed abrasive machining notably improves processability of inorganic, non-metallic workpieces such as glasses, glass-ceramics and ceramics.

While embodiments of the invention have been illustrated and described as phosphonate based anti-clogging agents and compositions incorporating same, the invention is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims:

What is claimed is:

1. A method for machining a ceramic substrate containing Al, comprising:
   providing a solution containing a phosphorus compound in direct contact with the ceramic of the ceramic substrate, the ceramic of the ceramic substrate comprising Al, the phosphorus compound being an organophosphorus compound, abrasive particles present in the solution as free abrasives, forming a slurry; and
   machining the substrate with the abrasive particles, wherein a ratio $MRR_{add}/MRR_{con}$ is not less than 1.2, where $MRR_{add}$ is the material removal rate of polishing the substrate with said slurry comprising the abrasive and the organophosphorus compound, and where $MRR_{con}$ is a material removal rate under identical process conditions with a control slurry free of the organophosphorus compound;
   wherein the organophosphorus compound is selected from the group consisting of hydroxy phosphono acetic acid, aminotri-(methylenephosphonic acid), hexapotassium-hexamethylenediaminetetra-(methylenephosphonic acid), 2-phosphonobutane-1,2,4-tricarboxylic acid, phosphate acid ester of ethoxylated phenol, and hydroxyethylidinediphosphonic acid.

2. The method of claim 1, wherein the abrasive particles have a median particle size within a range of about 0.05 microns to about 1.5 microns.

3. The method of claim 1, wherein the abrasive particles have a median particle size within a range of about 1.5 micron to 50 microns.

4. The method of claim 1, wherein the abrasive particles are selected from the group consisting of silica, zirconia, silicon carbide, boron carbide, and diamond.

5. The method of claim 1, wherein the substrate comprises aluminum oxide.

6. The method of claim 1, wherein the substrate comprises a non-oxide ceramic containing aluminum.

7. The method of claim 1, wherein the hydroxyethylidinediphosphonic acid comprises 1-hydroxyethylidine- 1,1'-diphosphonic acid (HEDP).

8. The method of claim 1, wherein the solution is aqueous.

9. The method of claim 1, wherein the phosphorus compound is provided in the solution at a concentration within a range of about 0.05 to about 5.0 wt%.

10. The method of claim 1, wherein the fluid further comprises a lubricious component, the lubricious component being selected from the group consisting of 1) nonionic functional chemistries including alcohols, thiols, esters, amides, amines, amine oxides or imides and derivatives thereof, 2) anionic functional chemistries including phosphates, phosphonates, sulfates, sulfonates or carboxylates and derivatives thereof, 3) cationic functional chemistries such as quaternary amines or amine salts and derivatives thereof, and 4) amphoteric functional chemistries including proprionates, betaines, glycinates or sultaines and derivatives thereof.

11. The method of claim 1, wherein the organophosphorus compound includes aminotri-(methylenephosphonic acid).

12. The method of claim 1 wherein the organophosphorus compound includes hydroxy phosphono acetic acid.

13. The method of claim 1, wherein the solution has a pH of greater than 8.

14. The method of claim 1, wherein the ratio is not less than 1.5.

15. The method of claim 14, wherein the ratio is not less than 1.8.

16. A method for machining a substrate, comprising:
providing a solution in direct contact with the substrate, the substrate comprising a ceramic containing the element Al, the solution comprising an organophosphorous compound in an amount of 0.5 wt% to 5.0 wt% and abrasive particles in the solution as free abrasives, forming a slurry; and
machining the substrate with the abrasive particles, wherein a ratio $MRR_{add}/MRR_{con}$ is not less than 1.8, where $MRR_{add}$ is the material removal rate of polishing the substrate with said slurry comprising the abrasive and the organophosphorus compound, and where $MRR_{con}$ is a material removal rate under identical process conditions with a control slurry free of the organophosphorus compound;
wherein the organophosphorus compound is selected from the group consisting of hydroxy phosphono acetic acid, aminotri-(methylenephosphonic acid), hexapotassium-hexamethylenediaminetetra-(methylenephosphonic acid), 2-phosphonobutane-1,2,4-tricarboxylic acid, phosphate acid ester of ethoxylated phenol, and hydroxyethylidinediphosphonic acid.

17. A method for machining a substrate, comprising:
providing an solution in direct contact with the substrate, the substrate comprising a ceramic containing the element Al, the solution comprising an organophosphorous compound in an amount of 0.5 wt% to 5.0 wt% and having a pH greater than 8, the solution comprising abrasive particles as free abrasives, forming a slurry; and
machining the substrate with the abrasive particles, wherein a ratio $MRR_{add}/MRR_{con}$ is not less than 1.8, where $MRR_{add}$ is the material removal rate of polishing the substrate with said slurry comprising the abrasive and the organophosphorus compound, and where $MRR_{con}$ is a material removal rate under identical process conditions with a control slurry free of the organophosphorus compound;
wherein the organophosphorus compound is selected from the group consisting of hydroxy phosphono acetic acid, aminotri-(methylenephosphonic acid), hexapotassium-hexamethylenediaminetetra-(methylenephosphonic acid), 2-phosphonobutane-1,2,4-tricarboxylic acid, phosphate acid ester of ethoxylated phenol, and hydroxyethylidinediphosphonic acid.

* * * * *